United States Patent [19]

Dupommier

[11] Patent Number: 4,634,489
[45] Date of Patent: Jan. 6, 1987

[54] DEVICE FOR TRANSFERRING A TIRE CARCASS BAND

[75] Inventor: Jean M. Dupommier, Athus, Belgium

[73] Assignee: The Goodyear Tire & Rubber Company, Akron, Ohio

[21] Appl. No.: 632,144

[22] Filed: Jul. 18, 1984

[51] Int. Cl.$^4$ .................. B29D 30/20; B29D 30/08
[52] U.S. Cl. .................. 156/403; 156/126; 156/406.2; 414/225; 414/752
[58] Field of Search ............ 156/396, 398, 403, 406.2, 156/414, 415, 416, 123, 126, 127; 414/225, 752, 910, 751, 749; 29/235; 211/20, 23, 79; 248/363

[56] References Cited

U.S. PATENT DOCUMENTS

| | | | |
|---|---|---|---|
| 3,909,335 | 9/1975 | Jellison | 156/396 |
| 4,007,080 | 2/1977 | Klöpper | 156/396 |
| 4,053,342 | 10/1977 | Appleby et al. | 156/123 |
| 4,468,267 | 8/1984 | Irie | 156/403 |

FOREIGN PATENT DOCUMENTS 0069047 1/1983 European Pat. Off. .

Primary Examiner—Edward Kimlin
Assistant Examiner—Thomas Bokan
Attorney, Agent, or Firm—T. P. Lewandowski

[57] ABSTRACT

A device for transferring an uncured tire carcass of cylindrical shape and comprising a cylindrical housing, a plurality of suction cups disposed in at least three circular bands around the housing, said bands being located one at each end portion and one in a mid-portion of the housing and each cup is connected to an actuator for radial movement and is also connectable to a vacuum source. Also, a plurality of tire bead retaining means are located in two circular bands at the desired axial bead locations, each band having at least three retaining means equiangularly spaced therein, each retaining means being connected to an actuator for radial movement for retention or release of the bead. The bead retaining means hold the bead, concentric with, and radially spaced from the outer surface of the carcass.

21 Claims, 6 Drawing Figures

DEVICE FOR TRANSFERRING A TIRE CARCASS BAND

BACKGROUND OF THE INVENTION

The present invention relates to a device for transferring a tire carcass band from a carcass band building station to a tire building station, and also to a method of building a tire using such a device.

The commonly used building techniques for radial tires require that the tire carcass is formed as a cylindrical carcass band at a carcass building drum, and is then transferred to a tire building drum where it is formed into a torroidal shape and the circumferential reinforcing breakers and tread are added. The carcass band can be transferred directly from the carcass building drum to the tire building drum, or alternatively the carcass bands are housed for a short time period between the two operations. With larger size tires, for example, truck tires, agricultural tires, and off-the-highway tires, the cylindrical carcass bands may not have sufficient strength to support themselves during transfer between the carcass band building and tire building drums. The consequent slight distortion of the carcass band under its own weight may effect the quality of the eventually produced tire.

The present invention provides a transfer device that seeks to minimize the above problem.

The present invention also provides a method for the transfer of tire beads to the tire building drum, and the accurate location of the beads with respect to the carcass band.

SUMMARY OF INVENTION

According to the present invention there is provided a transfer device for transferring a uncured tire carcass of substantially cylindrical shape from a carcass building station to a tire building station, said device comprising: a hollow housing for receiving a carcass; a first means attached to the housing to provide support for the outer cylindrical surface of the carcass, said first means supporting the carcass at least at each end portion and a mid portion thereof and around substantially the whole outer cylindrical surface at said portions; and a second means also attached to the housing to hold at least one tire bead independently of and spaced radially outward from a carcass, so that a carcass and at least one bead can be simultaneously transferred from the carcass building station to the tire building station.

Also, there is further provided a transfer device for transferring an uncured tire carcass of a substantially cylindrical shape and including a hollow cylindrical housing for receiving a carcass comprising a circular support frame, at least 3 struts equiangularly spaced around the support frame and each extending axially on each side of the support frame, and two circular end plates located on each side of the support frame to hold the ends of the struts in a circular way;

a first means for supporting the outer cylindrical surface of a carcass including frames attached to the housing;

a pair of second means, each of which holds a tire bead coaxially with a carcass supported within the housing; and a support for each of said second means, said supports being adjustably mounted on the housing so that the axial location of each of the tire beads can be altered, said supports for the second means being slideably mounted on the struts and said first means frames also being slideably mounted on the struts.

The advantage of this is that a single transfer device can be utilized to transfer a number of different carcasses having different bead setting, that is different axial distances between the beads.

The term axial refers to movement, or direction, along the longitudinal axis of the cylindrical carcass.

Further the invention provides a method of building a tire of a given bead diameter, utilizing the afore-mentioned devices and including the steps of: forming at one station a cylindrical carcass of a smaller diameter than said given bead diameter, axially locating the tire beads around the carcass, transferring the carcass and beads simultaneously to a second station, and assembling the carcass to the beads.

DESCRIPTION OF DRAWINGS

The invention will be described by way of example and with reference to the accompanying drawings in which.

DETAILED DESCRIPTION OF THE INVENTION

Figure 1:
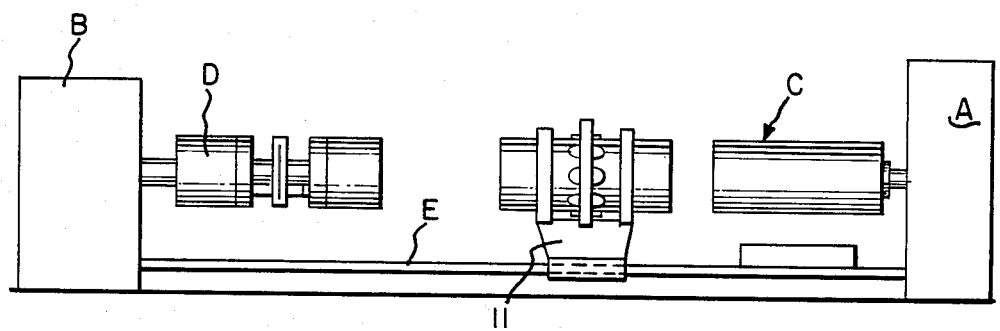
FIG. 1 is a schematic drawing showing the use of a transfer device according to this invention
Figure 2:
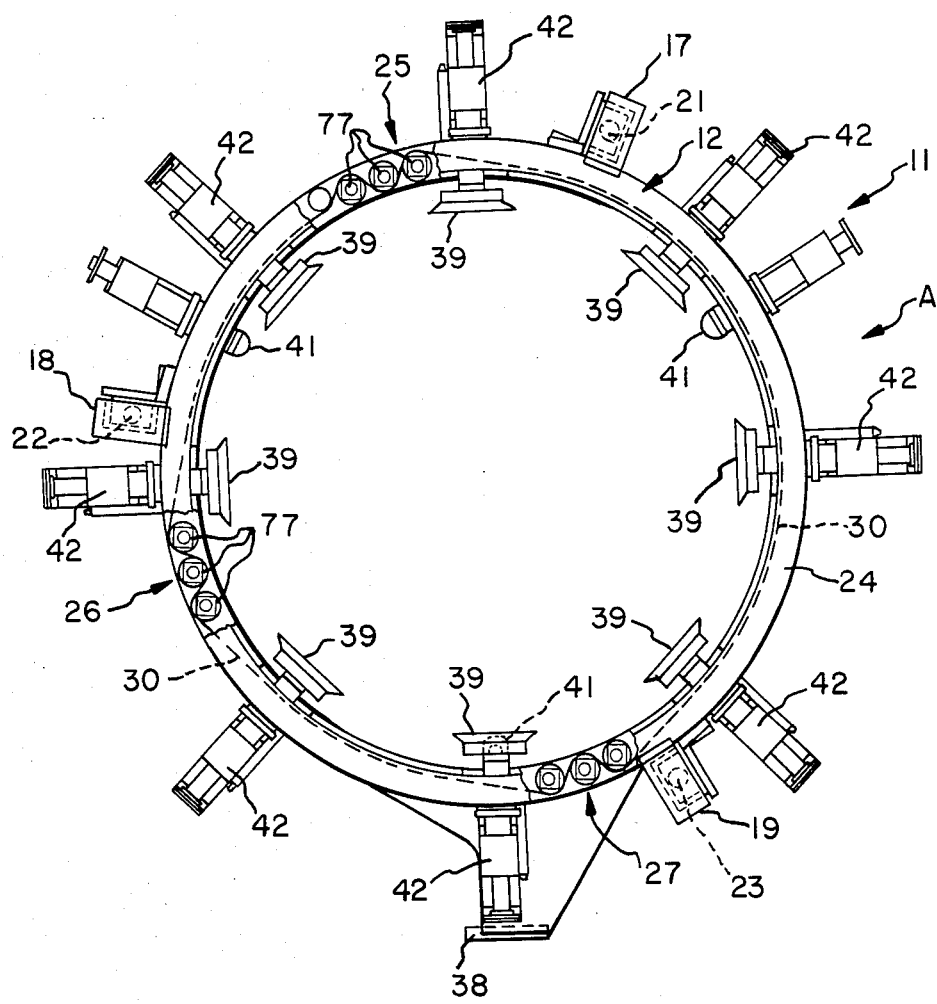
FIG. 2 is an end view of a transfer device according to this invention
Figure 3:
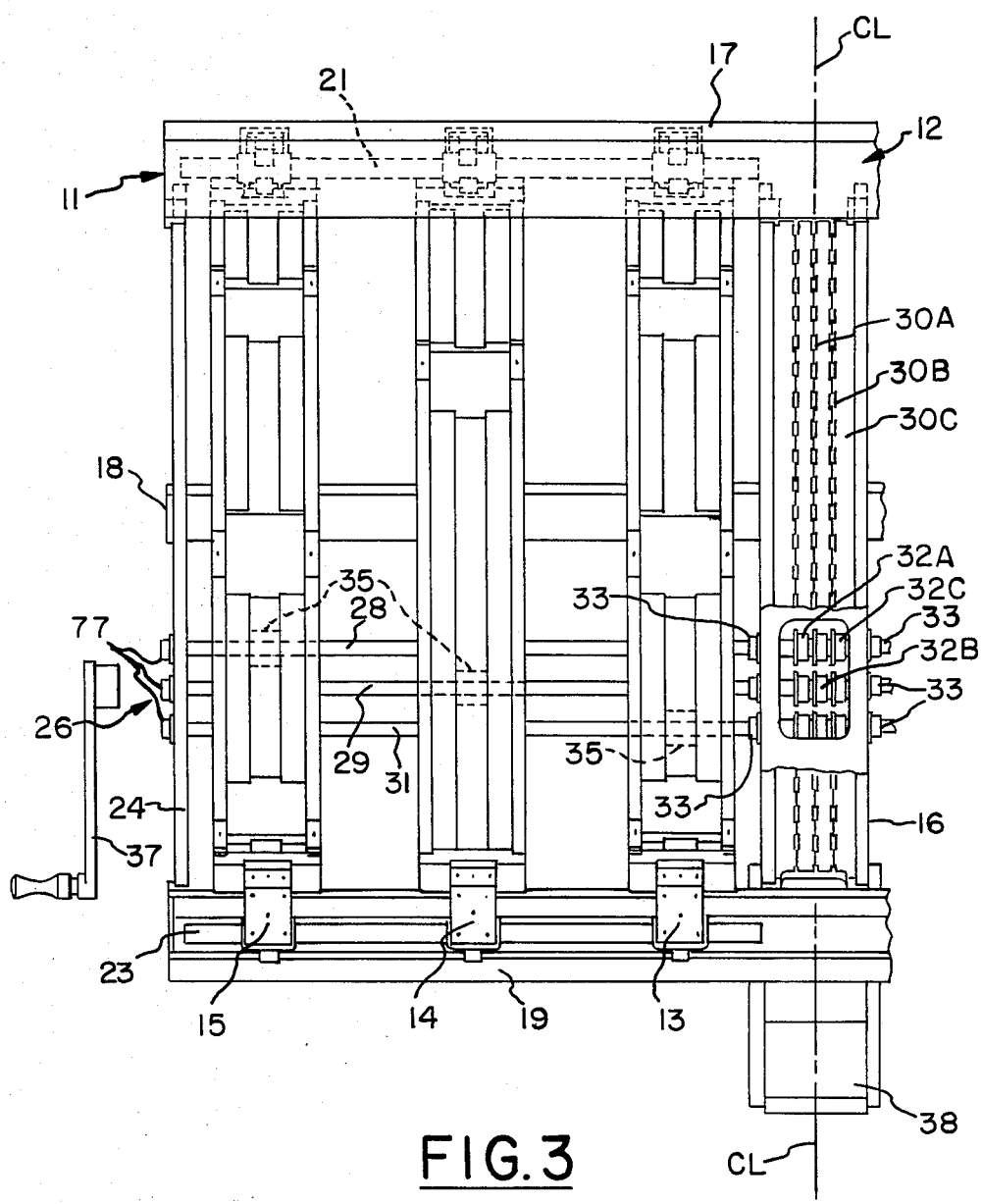
FIG. 3 is a partial view of the transfer device of FIG. 1 taken in the direction of arrow A, and showing the apparatus on one side only of its center line

With reference to FIG. 1 there is illustrated a transfer device 11 for conveying a substantially cylindrical uncured carcass of a tire from a carcass building machine A to a tire building and forming machine B. The transfer device can for example be arranged co-axially with both a carcass building drum C on the machine A and a tire forming drum D on machine B, and be slideably mounted on a base E for movement therebetween. With reference now to FIGS. 2 and 3, the transfer device 11 comprises a hollow housing 12 for receiving a cylindrical carcass. The housing 12 is preferably cylindrical and is formed of an open lattice work arranged symmetrically about a center line CL and having seven circular frames, a central support frame 16 at the axial center line CL flanked on each axial side by three circular frames 13, 14, and 15. For the purposes of the description of the housing 12 the terms axial and axially refer to the longitudinal axis of the cylindrical housing 12, and the term circumferentially refers to around the circumference of the cylindrical housing 12. The frames 13, 14, and 15 are axially spaced outwardly from each side of the central frame 16. The central support frame 16 is fixed and the other circular frames 13, 14, and 15 are axially moveable relative to the central support frame 16.

Three equiangularly spaced struts 17, 18, and 19 are fixed to the support frame 16 and extend axially on each side of the support frame 16. Each of the struts 17, 18, or 19 supports a tie bar 21, 22, and 23, respectively, on each side of the central frame 16. The other circular frames 13, 14, and 15 are each slideably supported on the three tie bars 21, 22, and 23, for axial movement relative to the central support frame 16. The outer ends of the struts 17, 18, and 19, on each side of the support frame 16 are each held in a circular relationship by a circular end plate 24. The frames 13, 14, and 15 can be moved axially along the tie bars 21, 22, and 23 by three sets 25, 26, and 27 of screw strut adjusters.

Each set 25, 26, or 27 of screw strut adjusters comprises three axial screw threaded struts 28, 29, and 31 each of which is rotatable in three bearings 32 held in the central frame 16, and in bushes in the end plate 24. Each bearing 32 has teeth thereon for engagement with an endless chain 30, and the three bearings 32 on each strut 28, 29, and 31 are in axial alignment and three endless chains 30A, 30B, and 30C extend circumferentially around the frame 16 so that each chain 30A or 30B or 30C engages with a bearing 32A, 32B and 32C respectively on all of the adjuster struts 28, 29 and 31. One of the three bearings 32 on each of the adjuster struts is made rotationally fast with its respective strut, so that the bearings 32A which engage with the chain 30A are made fast only with the screw struts 28, the bearings 32B that engage with the chain 30B are made fast with the struts 29, and bearings 32C that engage with the chain 30C are made fast with the struts 31. The bearings 32 are made fast with their respective struts by the use of roll pins for example. The bearings 32 which are free to rotate about a screw strut act as chain guides. Each screw strut 28, 29, or 31 has its axially center portion held in the central frame 16 by two nuts 33 that are adjusted to allow a minimum axial play for each strut of about 0.05/0.1 mm. Each nut 33 is then secured in position by a roll pin, or other suitable means. Thus each screw strut 28, 29, and 31 is free to rotate relative to the central frame 16 and will drive one of the chains 30. Each screw strut 28, 29, and 31 makes a screw threaded connection with one of the circular frames 13, 14, and 15, respectively. The screw threaded connection is by means of nuts 35 fixed to each frame 13, 14, or 15. Each frame has three nuts 35 secured thereto whereby it is connected to its respective screw struts, one strut in each of the three sets 25, 26, and 27 of adjusters.

The axial position of the frames 13, 14, and 15 on each side of the central frame 16, can be adjusted by applying a handle 37 to the square headed ends 77 of the screw threaded struts 28, 29, and 31 and turning the respective screw threaded strut in the required direction to axially move each of the circular frames to its required position. If, for example, the handle 37 is fitted to a screw strut 28 and the strut rotated, the toothed bearing 32a fixed to that strut 28, causes the chain 30A to move circumferentially around the frame 16 and rotate the other two screw struts 28. Thus the frame 15 will move smoothly on the tie bars 21, 22, 23 as all three struts 28 rotate simultaneously. Similarly the other frames 13 and 14 can be moved by applying the handle to anyone of the screw struts 31 and 29 respectively.

The central support frame 16 also has a mounting bracket 38 whereby it can be slideably mounted onto a base E (in FIG. 1) for movement between the tire carcass building station A and a tire building and forming station B.

The lattice work cylindrical housing 12, described above, provides a support for a first means for supporting a tire carcass and a second means for holding the tire beads co-axially with the carcass. In the embodiment of the present invention the first means for supporting the carcass is constituted by a plurality of flexible cups 39 from which air can be evacuated for attachment of the cup to the external surface of a carcass. The cups 39 are disposed in four circular bands, one per each of the circular frames 13 and 15, so that there is a circular band of cups at each end portion of the housing 12, and two circular bands of cups 39 in the center portion of the housing 12. The second means for holding the tire bead around the carcass is constituted by a plurality of bead retainers 41 which are in two circular bands, one on each of the two circular frames 14. The relative axial positions of the four bands of cups on the frames 13, and 15, and the two bands of the bead retaining means 41 on the frames 14 are adjustable, thereby making it possible to use the same circular housing 12 for transferring a number of different tire carcass bands.

Figure 4:
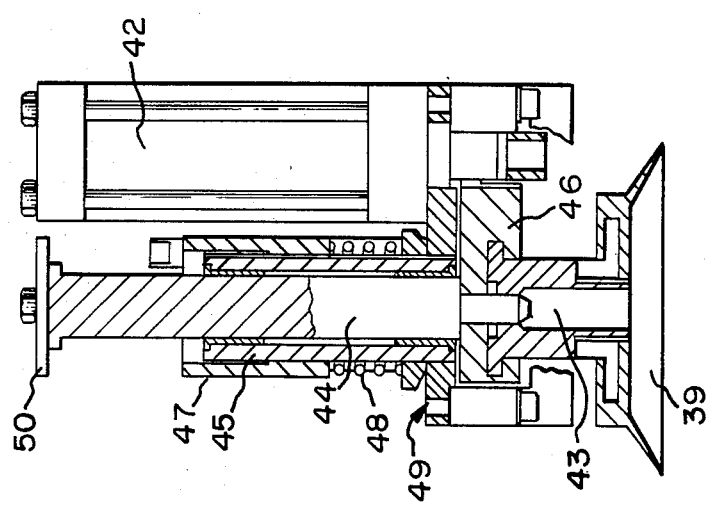
FIG. 4 is a detailed section of a flexible cup and actuator as used in the device of FIG. 2

With reference also to FIG. 4 the flexible cups 39 are arranged with eight circumferentially spaced, preferably equiangular cups on each frame 13, or 15 and are located radially outside of the diameter of the tire carcass to be transferred. Each cup 39 is connected to a pneumatic actuator 42 for radial movement relative to the respective frame 13, or 15, to which it is secured. Each cup 39 is fixed to one end of a guide rod 44 which is guided for radial movement by a surrounding sleeve 45, (that is radial movement with respect to the cylindrical housing 12). The respective pneumatic actuator 42 is arranged in parallel with the guide rod 44 and is connected to the rod 44 and the cup 39 by a bridge 46. An adjusting sleeve 47 is arranged co-axially with the sleeve 45 and makes screw threaded connection therewith so that the position of the sleeve 47 relative to the sleeve 45. can be altered. The guide rod 44 has an abutment 50 at its radially outer end and when the actuator 42 is operated to move the cup 39 to its radially innermost position, the abutment 50 comes up against the adjustment sleeve 47. The radially inward movement of the cup 39 can therefore be altered by adjusting the position of the sleeve 47 relative to the sleeve 45. The sleeve 47 is maintained in its adjusted position by a spring 48. This adjustment allows the travel of the cup 39 to be set for different diameter carcasses.

Each cup 39 with its respective actuator 42 and guide rod 44 is attached to its respective circular frame 13 or 15 by a bracket 49, and each cup 39 is connected via a central passageway 43 to a vacuum source (not shown) so that each cup 39 when brought into contact with the outer cylindrical surface of a tire carcass can attach itself thereto under the effect of vacuum.

Whilst in the present embodiment there are four circumferential bands of suction cups 39 on the housing 12, each band having eight circumferentially spaced cups therein it is envisaged that the number of cups 39 and the number of circumferential bands could be altered. For example the number of bands of cups 39 could be reduced to three, one at each axial end portion of the housing 12, and only one at the center portion, and the number of cups reduced to six in each band.

The bead retainers 41 are attached to the two circular frames 14 which lie one at each side of the center line CL at the required axial position for location of the tire beads. Each frame 14 has at least three retainers 41 circumferentially spaced thereon, preferably equiangularly, as is illustrated in FIG. 2. However, it is envisaged that up to eight retainers may be necessary depending upon how accurately it is required that a bead ring be concentrically located relative to the housing 12.

Figure 5:
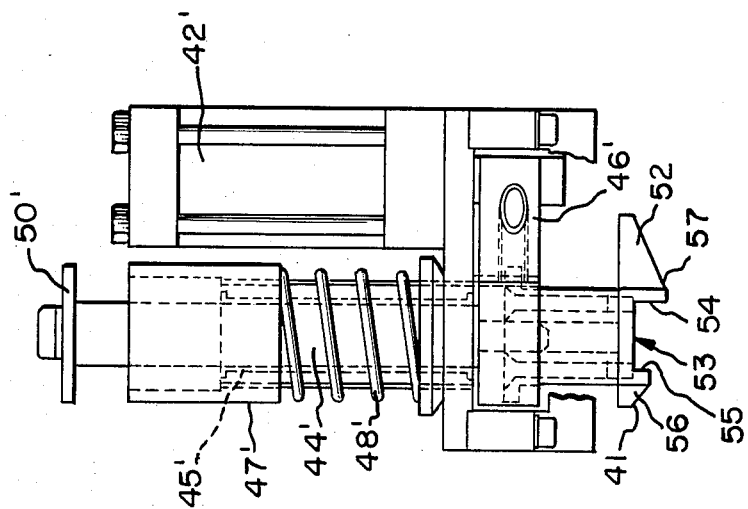
FIG. 5 is a detailed section of a tire bead retaining means used in the device.

With reference to FIG. 5, each bead retainer 41 comprises a head 52 with a slot 53 therein into which the bead ring can be fitted. The slot 53 has a high side 54 and low side 55. The retainer is arranged so that the low side 55 faces the end portion of the housing. A pair of chamfered surfaces 56 and 57 on the head 52 aid fitting of the beads. The retainers 41 are secured to their respective circular frames 14 so that the slots 53 on the heads 52 extend in the same circumferential plane and lie on the same nominal pitch circle, thereby forming an annular location for a tire bead. Each head 52 of a retainer 41 is guided for radial movement by a guide rod 44' which slides in sleeve 45' in the same manner as described for the cups 39 in FIG. 4. Also a pneumatic actuator 42' is arranged beside the guide rod 44' and is connected to the head 52' by a bridge 46'. The radial movement of the bead retainer is determined in a similar manner as described for the suction cups in FIG. 3.

The abutment 50' at the end of the guide rod 44' will come into engagement with the adjusting sleeve 47' when the bead retainer 41 is in its radially innermost position. The bead retainers 41 on each frame 14 are in their bead retaining mode when at their radially innermost position, and release the bead when actuated to move radially outwards. The radially innermost position of the bead retainer 41 is arranged to be radially outwardly of the radially inner position at which the suction cups 39 contact the tire carcass band.

Figure 6:
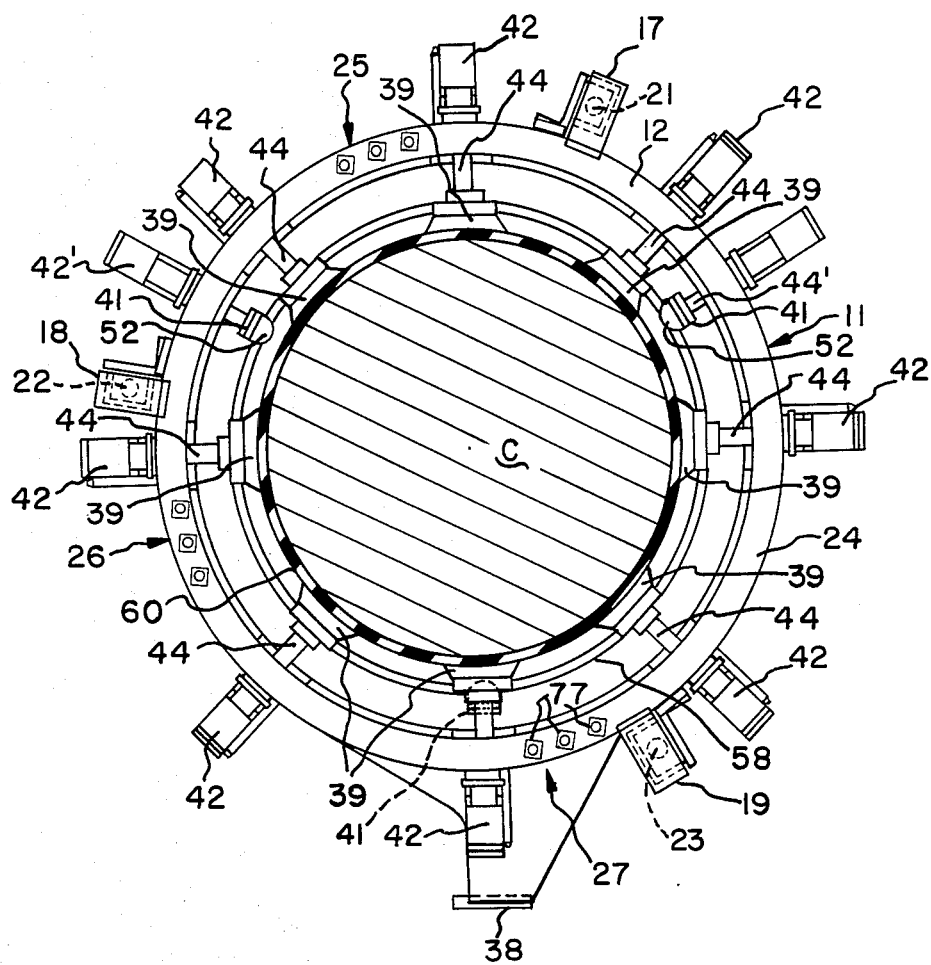
FIG. 6 is a view similar to FIG. 2, but including tire bead rings fitted in position over a carcass building drum.

With reference now to FIG. 6, the transfer device 11 operates as follows:

(I) the bead retaining means 41 are actuated to move their heads 52 to the radially innermost positions;

(II) an operator manually fits two tire bead rings 58 into position so that the bead rings are each located in the annular location provided by the slots 53;

(III) the transfer apparatus moves over a cylindrical carcass 60 which has been fabricated on the building drum C at a carcass building station A so that it is concentric with the carcass and drum C; and the bead rings 58 are concentric with but radially spaced from the tire band;

(IV) the flexible cups 39 are moved by their respective actuators 42 radially inwards of the bead ring 58 to contact the carcass 60 and air is evacuated from the cups 39 so that they attach themselves to the outer surface of the carcass 60. The carcass is released from the drum and actuators 42 then move the suction cups 39 radially outwardly lifting the carcass clear of the drum C;

(V) the transfer device 11 then moves from the carcass building drum C to the tire building drum D with the tire carcass 60 held in a cylindrical configuration by the cups 39;

(VI) the transfer apparatus 11 passes over the tire building drum D so that the carcass is co-axial with the tire building drum.

The tire building drum D expands to make contact with the carcass, and the vacuum to the cups 39 is cut-off. The tire building drum D further expands until the carcass is pushed against the bead rings 58 thereby assembling the carcass to the bead rings. At this point the bead retaining means 41 moves radially outwards by its respective actuators to release the bead rings. The cups 39 are also moved by their respective actuator 42 radially outwards to their outermost positions. The transfer apparatus can now be moved from the tire building drum leaving the carcass thereon.

I claim:

1. A transfer device for transferring an uncured tire carcass of a substantially cylindrical shape from a carcass building station to a tire building station and comprising:
    a hollow housing for receiving a tire carcass,
    a first means attached to the housing to provide support for the outer cylindrical surface of the carcass, said first means supporting the carcass at least at each end portion and a mid portion thereof and around substantially the whole outer cylindrical surface at said portions, and
    a second means attached to the housing and moveable solely in the radial direction with respect to the housing to hold at least one tire bead independently of and spaced radially outward from the carcass so that the carcass and tire bead so positioned can be simultaneously transferred from the carcass building station to the tire building station.

2. A transfer device as claimed in claim 1 the first means for supporting the carcass comprises:
    a plurality of flexible cups disposed in at least three co-axial circular bands within the housing, said bands being located one at each end portion and one at the mid-portion of the housing
    means for effecting movement of the cups to enable them to contact the outer cylindrical surface of a carcass and a means for evacuating air from within the cups.

3. A transfer device as claimed in claim 1 or claim 2 wherein two tire beads are transferred simultaneously with the carcass, said tire beads being located at the desired axial bead locations relative to the carcass and being circumferentially spaced radially from the radial outer surface of the carcass, said tire beads each being held in location by a respective said second means which comprise a co-axial circular band of at least three circumferentially spaced bead retainers in which the bead is located.

4. A device as claimed in claim 3, wherein each second means comprises eight retainers.

5. A device as claimed in claim 3, wherein each retainer includes a head with a slot therein and is orientated so that all said slots extend in the same circumferential plane, and lie on the same nominal pitch circle.

6. A device as claimed in claim 2, wherein each circular band of flexible cups comprises cups and their respective means for effecting movement thereof are equiangularly spaced around and secured to a first circular frame, said first circular frame being slideably mounted on the housing and being axially moveable relative thereto so that the axial position of each first frame can be altered to adjust to different size carcasses.

7. A device as claimed in claim 3 wherein each said second means comprises a circular band of bead retainers equiangularly spaced around and secured to a second circular frame, said second circular frame being slideably mounted on the housing and being axially moveable relative thereto so that the axial position of each second frame can be altered.

8. A device as claimed in claim 6 wherein each circular frame is connected to at least one screw strut adjuster whereby the axial position of each frame can be altered.

9. A device as claimed in claim 8, wherein there are three circumferentially spaced screw strut adjusters per circular frame.

10. A device as claimed in claim 9, wherein there are four circular bands of flexible cups, and two further circular bands of bead retainers, the cylindrical housing having a central circular support frame which is fixed at the axial center portion of the housing, the four circular bands of flexible cups are arranged two on each axial side of the central support frame and the two circular bands of bead retainers are located one on each axial side of the central support frame axially between the two circular bands of suction cups.

11. A device as claimed in claim 10, wherein the screw strut adjusters are axially fixed to the central support frame.

12. A device as claimed in claim 2, wherein the flexible cups are equiangularly spaced in each circular band.

13. A device as claimed in claim 12, wherein there are four circular bands of suction cups, one at each end portion of the housing and two in the mid portion of the housing.

14. A device as claimed in claim 12, or 13, wherein the means for effecting movement of each cup is a pneumatic actuator and each cup is independently operated by its respective actuating means.

15. A device as claimed in anyone of claim 6 wherein the housing comprises an axially central circular support frame, at least three equiangularly circumferentially spaced axial struts fixed to the central support frame, and two circular end plates which hold the axially outer ends of the struts in a circular relationship.

16. A device as claimed in claim 15 wherein each of said first and second frames is axially slideable on tie bars mounted on the axial struts.

17. A transfer device for transferring an uncured tire carcass of a substantially cylindrical shape from a carcass building station to a tire building station and comprising:
  a hollow cylindrical housing for receiving a carcass comprising a circular support frame, at least 3 struts equiangularly spaced around the support frame and each extending axially on each side of the support frame, and two circular end plates located on each side of the support frame to hold the ends of the struts in a circular way;
  a first means for supporting the outer cylindrical surface of a carcass including frames attached to the housing;
  a pair of second means, each of which holds a tire bead coaxially with and radially outward of a carcass supported within the housing; and
  a support for each of said second means, said supports being adjustably mounted on the housing so that the axial location of each of the tire beads can be altered, said supports for the second means being slideably mounted on the struts and said first means frames also being slideably mounted on the struts.

18. A device as claimed in claim 17 wherein the first means for supporting the carcass comprise a plurality of flexible cups disposed in at least three coaxial bands within the housing, means for effecting movement of the cups to enable them to contact the outer surface of a carcass, and means for evacuating air from the cups, wherein each band of flexible cups and their respective means for effecting movement thereof, are equiangularly spaced and secured to the frame.

19. A device as claimed in claim 18 wherein said support means is a circular frame which is slideably mounted on the struts.

20. A device as claimed in anyone of claims 17, 18, or 19 wherein the axial position of said circular frames on the struts can be altered by means of screw thread adjusters operably connected between each of said circular frames and the circular support frame.

21. A device as claimed in claim 20 wherein each circular frame is moveable by three equiangularly spaced axially extending screw thread struts, the three respective struts for each frame being operatively interconnected so that adjustment of anyone strut automatically effects adjustment of the other two struts.

* * * * *